US009928533B2

(12) United States Patent
Fishman et al.

(10) Patent No.: US 9,928,533 B2
(45) Date of Patent: Mar. 27, 2018

(54) AGGREGATION OF GROUP OF PRODUCTS CONTENT AND PROVIDING WAYS TO DISPLAY, VIEW, ACCESS, SHARE AND CONSUME CONTENT

(71) Applicant: Pipit Interactive, Inc., Los Angeles, CA (US)

(72) Inventors: David Fishman, Los Angeles, CA (US); Srinivasa Boppana, Irvine, CA (US)

(73) Assignee: Bao Tran, Saratoga, CA (US)

( * ) Notice: Subject to any disclaimer, the term of this patent is extended or adjusted under 35 U.S.C. 154(b) by 938 days.

(21) Appl. No.: 14/321,868

(22) Filed: Jul. 2, 2014

(65) Prior Publication Data

US 2015/0026015 A1    Jan. 22, 2015

Related U.S. Application Data

(60) Provisional application No. 61/847,656, filed on Jul. 18, 2013, provisional application No. 61/847,890, filed on Jul. 18, 2013.

(51) Int. Cl.
*G06Q 30/06* (2012.01)
*G06Q 50/00* (2012.01)

(52) U.S. Cl.
CPC ..... *G06Q 30/0627* (2013.01); *G06Q 30/0603* (2013.01); *G06Q 30/0631* (2013.01); *G06Q 30/0641* (2013.01); *G06Q 30/0643* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 6,901,379 | B1 * | 5/2005 | Balter | G06Q 30/06 434/395 |
| 7,472,082 | B2 * | 12/2008 | Wirth, Jr. | G06Q 30/06 705/26.8 |
| 8,170,919 | B2 * | 5/2012 | Barbour | G06Q 10/10 705/26.1 |
| 9,141,671 | B2 * | 9/2015 | Schmidt | G06F 17/30525 |
| 9,275,409 | B2 * | 3/2016 | Mebed | G06Q 30/0627 |
| 9,639,880 | B2 * | 5/2017 | Dalal | G06Q 30/0643 |
| RE46,471 | E * | 7/2017 | Barbour | G06Q 10/10 |
| 2004/0059645 | A1 * | 3/2004 | Wirth, Jr. | G06Q 30/06 705/26.8 |

(Continued)

OTHER PUBLICATIONS

Anon., "Yahoo Makes Shopping More Social; Visitors to Yahoo Shopping can create the own list of products they love or hate and add their own reviews and pictures," InformationWeek, Nov. 15, 20105.*

(Continued)

*Primary Examiner* — Nicholas D Rosen
(74) *Attorney, Agent, or Firm* — Tran & Associates

(57) ABSTRACT

Systems and methods are disclosed to create, aggregate, and syndicate a group of product or content attributes and provide ways to access, display, filter, share, merchandise, shop and consume the created content repository using a collection recommendation and merchandising engine via web services independent of where the content is created or updated.

16 Claims, 14 Drawing Sheets

(56) References Cited

U.S. PATENT DOCUMENTS

| | | | |
|---|---|---|---|
| 2005/0114774 A1* | 5/2005 | Berryman | G06F 9/445 |
| | | | 715/700 |
| 2005/0125401 A1* | 6/2005 | Carr | G06Q 30/02 |
| 2006/0195362 A1* | 8/2006 | Jacobi | G06Q 30/02 |
| | | | 705/343 |
| 2009/0165140 A1* | 6/2009 | Robinson | G06F 21/10 |
| | | | 726/26 |
| 2010/0017307 A1* | 1/2010 | Barbour | G06Q 10/10 |
| | | | 705/26.1 |
| 2010/0293073 A1* | 11/2010 | Schmidt | G06F 17/30525 |
| | | | 705/26.62 |
| 2012/0005044 A1* | 1/2012 | Coleman | G06Q 30/02 |
| | | | 705/27.2 |
| 2012/0078731 A1* | 3/2012 | Linevsky | G06Q 30/0277 |
| | | | 705/14.73 |
| 2013/0036117 A1* | 2/2013 | Fisher | G06F 17/30029 |
| | | | 707/736 |
| 2013/0215116 A1* | 8/2013 | Siddique | G06Q 30/0643 |
| | | | 345/420 |
| 2013/0268408 A1* | 10/2013 | Mebed | G06O 30/0627 |
| | | | 705/26.62 |
| 2014/0207609 A1* | 7/2014 | Earhart | G06Q 30/0631 |
| | | | 705/26.7 |
| 2015/0025996 A1* | 1/2015 | Fishman | G06Q 30/0627 |
| | | | 705/26.7 |
| 2015/0170250 A1* | 6/2015 | Dalal | G06Q 30/0643 |
| | | | 705/26.7 |
| 2017/0132693 A1* | 5/2017 | Fishman | G06Q 30/0643 |

OTHER PUBLICATIONS

Anon., "Recommendr Add Wish List Feature to Social Shopping Question and Answer Website; Feature Enables Consumers to Create and Share Product Wish Lists to Help with Holiday Shopping," PR Newswire, Nov. 20, 2007.*

Leitner et al., "Collaborative Shopping Networks: Sharing the Wisdom of Crowds in E-Commerce Environments" (2008). Bled 2008 Proceedings. 21.*

* cited by examiner

AGGREGATION OF GROUP OF PRODUCTS CONTENT AND PROVIDING WAYS TO DISPLAY, VIEW, ACCESS, SHARE AND CONSUME CONTENT

The present application claims priority to Provisional Application Nos. 61/847,656 filed Jul. 18, 2013 and 61/847,890 filed Jul. 18, 2013.

BACKGROUND

The present invention is directed to a system and method for online shopping.

Retailers spend over $6 billion in online advertising, the most of any category. They invest even more in offline above and below the line advertising driving traffic to digital channels. EMarketer predicts that the online apparel and accessories category is expected to grow by 20% to $40.9 billion in 2012.

Retailers have already invested heavily and plan to invest more in driving traffic to their website properties, and now also mobile sites and apps, growing their email database, increasing their social media presence, and leveraging others social media presence . . . with the #1 driver being proof of ROI.

Point of Sale (POS) leaders like NCR see a need to evolve their products to a "cloud-based point-of-sale (POS) software platform that enables independent retailers to manage transactions, track sales and inventory, process credit cards and market to customers on both POS touch screen terminals and Apple mobile devices."

FIG. 1 shows an exemplary conventional shopping system. Online shopping also has the disadvantage that the buyer cannot physically inspect the item. While that disadvantage is minor for bookstores, it is a major problem for apparel retailers, since customers prefer to try on apparel before buying.

To overcome that disadvantage, various techniques for virtual modeling of apparel, particularly eyewear, have been developed. An illustrative example of such a technique is disclosed in U.S. Pat. No. 5,983,201 to Fay. The online retailer obtains digital images of the customer's head and face to obtain size and image data. Later, the customer can visit the online retailer's Web site from any location, such as the customer's home, to view various kinds of eyeglasses. The online retailer's server generates images of the customer with the eyeglasses resized to fit the customer's head to show how the customer would look in each kind of eyeglasses.

Apparel shopping is a social event. Many customers do not simply wish to see for themselves how they would look in a particular item of apparel; instead, they bring along friends or family members and solicit those friends' or family members' opinions before making a buying decision. Shoppers may also solicit the opinions of store clerks or of complete strangers. It is difficult to do any of those things in front of a computer. Furthermore, trips to brick-and-mortar shopping malls have a social role that online shopping has not yet duplicated.

It is also known in the art to allow potential buyers to exchange information about items over the Internet. Such information exchanges typically take the form of non-real-time message boards such as those on Deja.com, or the reader reviews of Amazon.com. The use of chat rooms to let potential buyers exchange information is taught by U.S. Pat. No. 6,041,311 to Chislenko et al, U.S. Pat. No. 6,049,777 to Sheena et al and U.S. Pat. No. 6,058,379 to Odom et al.

However, such information exchanges do not overcome the above-noted problems with Fay and similar techniques. U.S. Pat. No. 6,901,379 discloses a system that allows a user to browse an online retailer's Web site or a mirror site and select an item and model the item online by having a server generate a digital image of the user wearing the item. If the user is still unsure as to whether to buy the item, the user can enter an online chat room in which the online modeling image is displayed to other users. The user can then receive the other users' feedback before deciding whether to buy the item. In a second embodiment, multiple online modeling images are generated to provide the user with a customized catalog, which can be of items for a single merchant or multiple merchants.

U.S. Pat. No. 7,949,659 discloses systems for selecting items to recommend to a user. The system includes a recommendation engine with a plurality of recommenders, and each recommender identifies a different type of reason for recommending items. In one embodiment, each recommender retrieves item preference data and generates candidate recommendations responsive to a subset of that data. The recommenders also score the candidate recommendations. In certain embodiments, a normalization engine normalizes the scores of the candidate recommendations provided by each recommender. A candidate selector selects at least a portion of the candidate recommendations based on the normalized scores to provide as recommendations to the user. The candidate selector also outputs the recommendations with associated reasons for recommending the items.

U.S. Pat. No. 8,170,919, issued to the assignee of the instant invention, discloses an inventive system and method for collaborative commerce that includes activating an art board, placing items onto the art board, inviting users to interact with the art board, and collaborating with the invited users. Additional features and functions include purchasing items shown on the art board, including by placing the items in a shopping cart, using e-mail, text messaging, and instant messaging to invite users, who may be chosen from a buddy list. Collaborating can be performed using voice chatting, video chatting, instant messaging, and text messaging, and includes examining reviews, ratings, reputations, and recommendations, and also includes displaying details regarding the items. In addition, reports comprising information regarding the items can be generated. A toolbar can be located on the art board and used to initiate inviting of users and placing of items onto the art board.

SUMMARY

Systems and methods are disclosed to create, aggregate, and syndicate group of product or content attribute collection and provide ways to access, display, filter, share, merchandise, shop and consume the created content repository using a collection recommendation and merchandising engine via web services independent of where the content is created or updated.

Implementations of the system can include one or more of the following. An eco-system provides a way to create, access, view, share, present, syndicate, filter, merchandise, and shop various collections ("Pipit Content"), which is a list of group of products and/or content with attributes (name, SKU, price, image, description, etc.,) and associated attribute content (a name, category, created by, created date, number views, number of shares, number of social likes, creator type, etc.,) that could be created—by providing a visitor an option to create a group of selected products from a product catalog with options to filter/chose specific product from the product catalog—which could be aggregated from various websites, applications and systems, and can be stored as a data base repository (from now on called as "Pipit Collection Repository—PCR"). PCR data could be accessed/shared/syndicated by other websites or applications leveraging a collection recommendation and merchandising engine via web services or API integration. "Pipit Content" collection could be something like a look(s) or an outfit(s) with multiple products with product and content attributes, or a buddy list of multiple products with attributes, or a wish list of product attributes and their associated attributes. The system includes the following functions:

Ability to Create/Save Collections (Pipit Collection) at one or more websites or by apps Syndicate the created collections independent of where the Pipit content is created, and aggregates into a Pipit Collection Repository (PCR)

Provides access to PCR and its recommendation and merchandising engine via web services or API integration Provides the ability to share, view, filter, merchandise, and shop the aggregated PCR data at one or more websites including Pipit.com and/or apps Ability to track, monitor, and report the usage metrics The Collections system aggregates the "Pipit Content" collection data (PCR) created at and/or by Pipit.com or external websites, and provides ways (via direct access, or web services or other means) to consume the PCR data via a web, and/or mobile and/or web services so that a visitor can access, view, share, and shop the "Pipit Content" independent of where the original content is created whether Pipit Content is created at Pipit.com or external website, but will be hosted and displayed for visitors at Pipit.com website The Collections system could be accessed via a web browser, website, or a mobile website, or a mobile app or a web service and PCR data could be displayed on any device where HTML content can be displayed.

The collections system will have options to filter the PCR data based on product or associated attributes for example, a given product brand, manufacturer, or a retailer brand, or an option type (size, or color), or a keyword ("green paint", "diamonds", or "sandals", etc.,) and will have ability to see each product's attributes within the "Pipit Content" (say, a look, or an outfit, etc.,), and be able to view, shop or purchase a product or multiple products or the entire "pipit content" (for example, an entire outfit with various products).

Advantages of the system may include one or more of the following. The system offers a real-time social framework and consumer generated content engine. The system delivers a cross-channel solution leveraging ways to engage and convert today's social shopper. First, the system offers an enhanced shopping experience on the web, Tablet, Facebook or landing pages creating a product artboard-based experience like Pinterest boards and Polyvore creation tools. Second, consumers generate rating, sentiment and open graph metrics allowing retailers to make data-driven merchandising choices. Third, retailers increase their conversion on digital traffic via an enhanced landing page experience. Trials show consumers spending an average of 2× the amount of time in a Pipit session vs. the traditional ecommerce shopping experience and increasing the average order value. The system helps Retailers merchandise and make landing pages fresh, appealing, and action-oriented vs. passive browsing or hunt and peck eCommerce. While the system automatically "learns" and populates collection pages with the most relevant content, merchandisers can also drill into the data to understand shoppers' tastes to interpret "what's hot" or "what's relevant" and even "what's next". The system Pipit multiplies retailer traffic in the process via social sharing and also enhances the shopping process via consumer or influencer (including a spokesperson) generated content. Retailers gets increasing returns on multiple digital channels and marketing programs.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
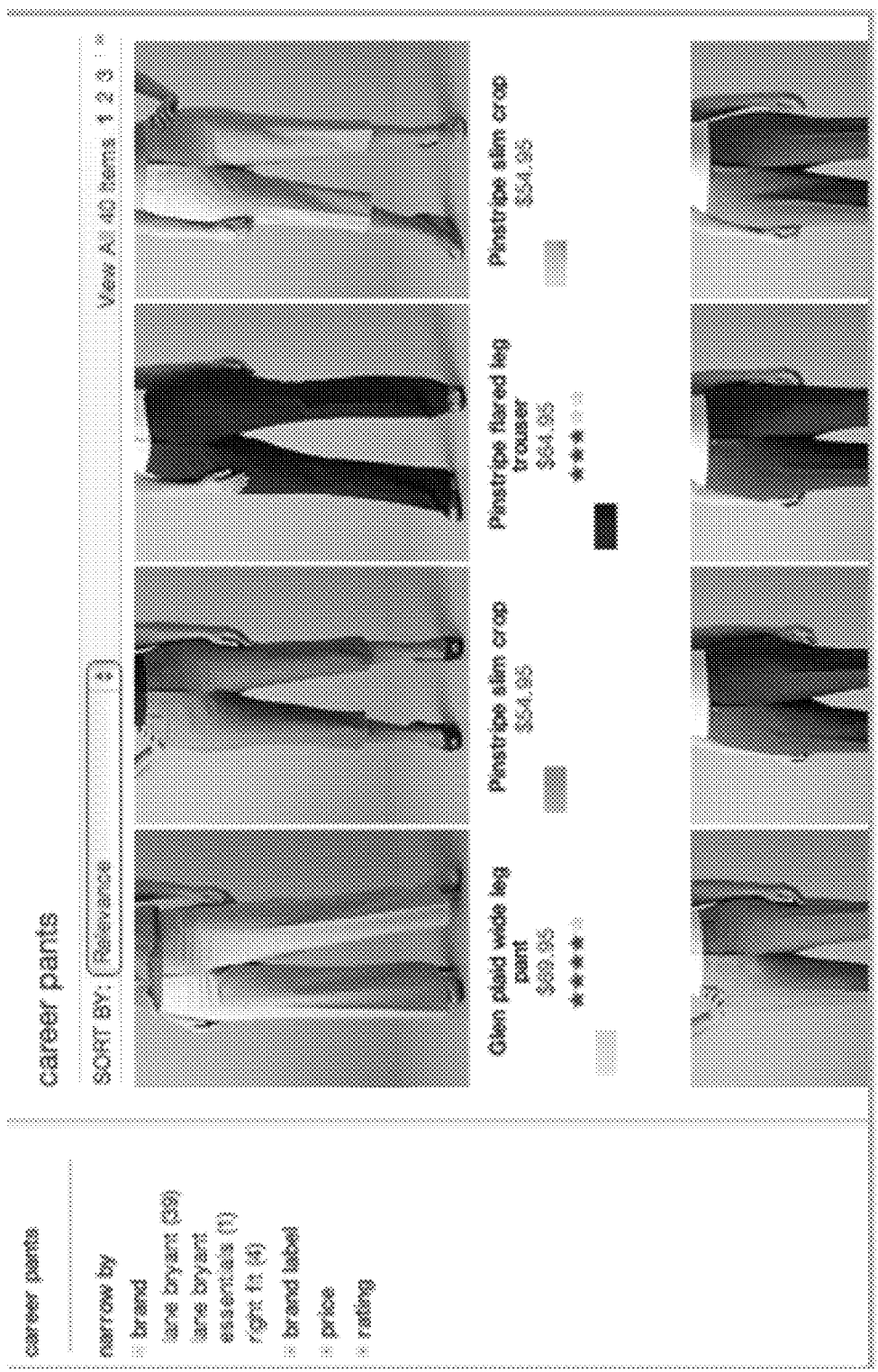
FIG. 1 shows a conventional shopping system.
Figure 2:
FIGS. 2-9 shows various exemplary user interface for a real-time social framework and consumer generated content engine for shopping.
Figure 3:
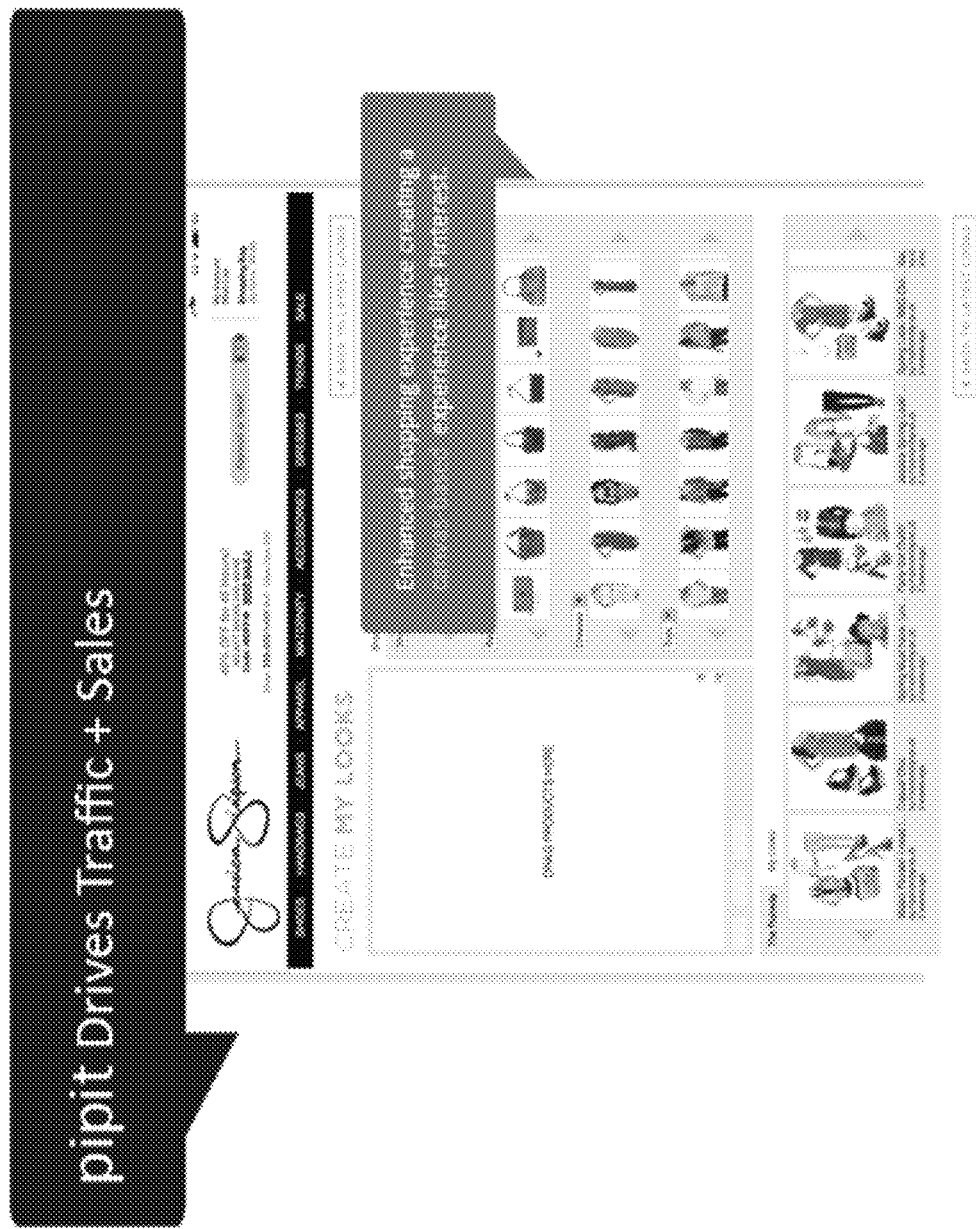
Figure 4:
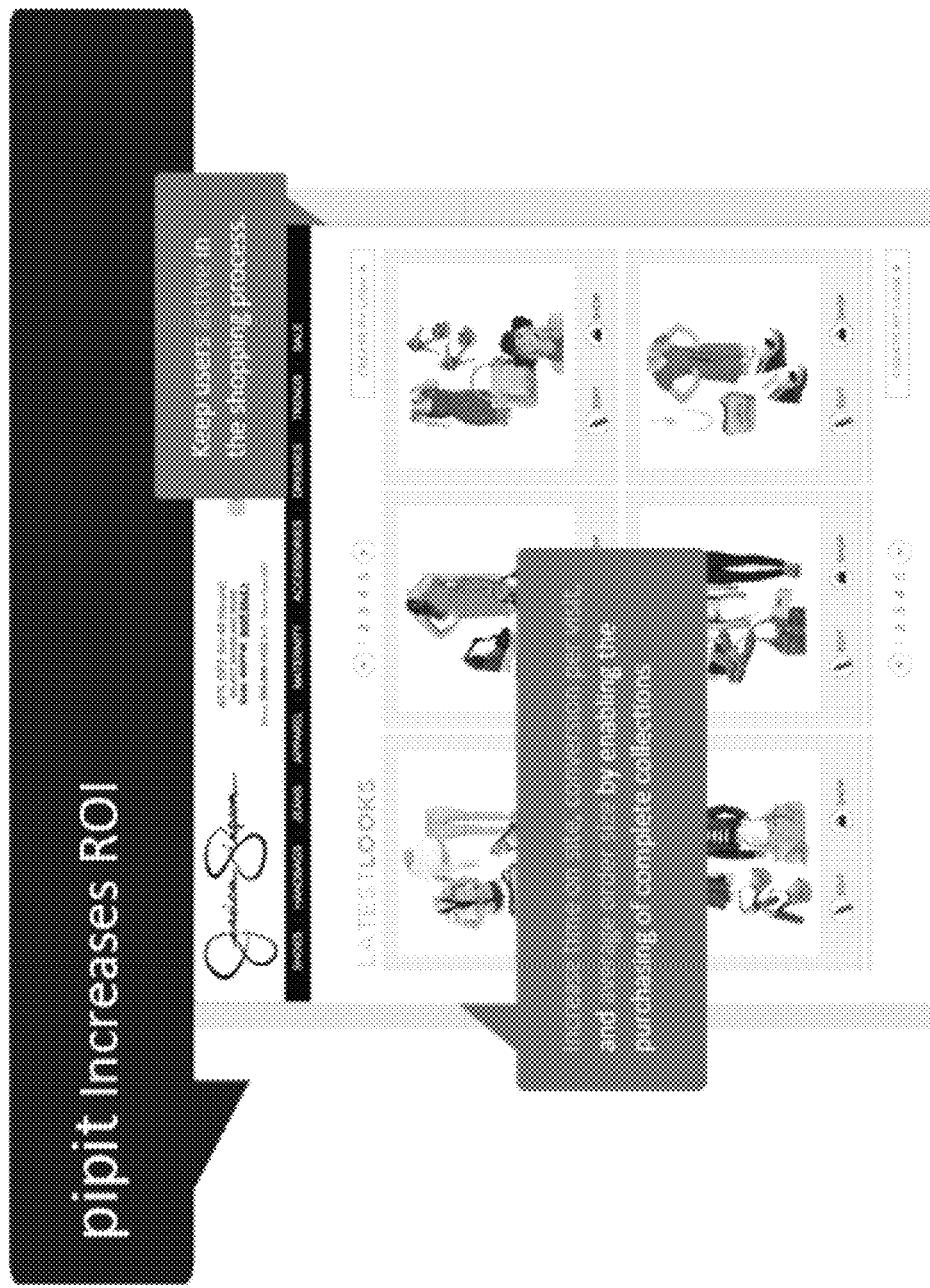
Figure 5:
Figure 6:
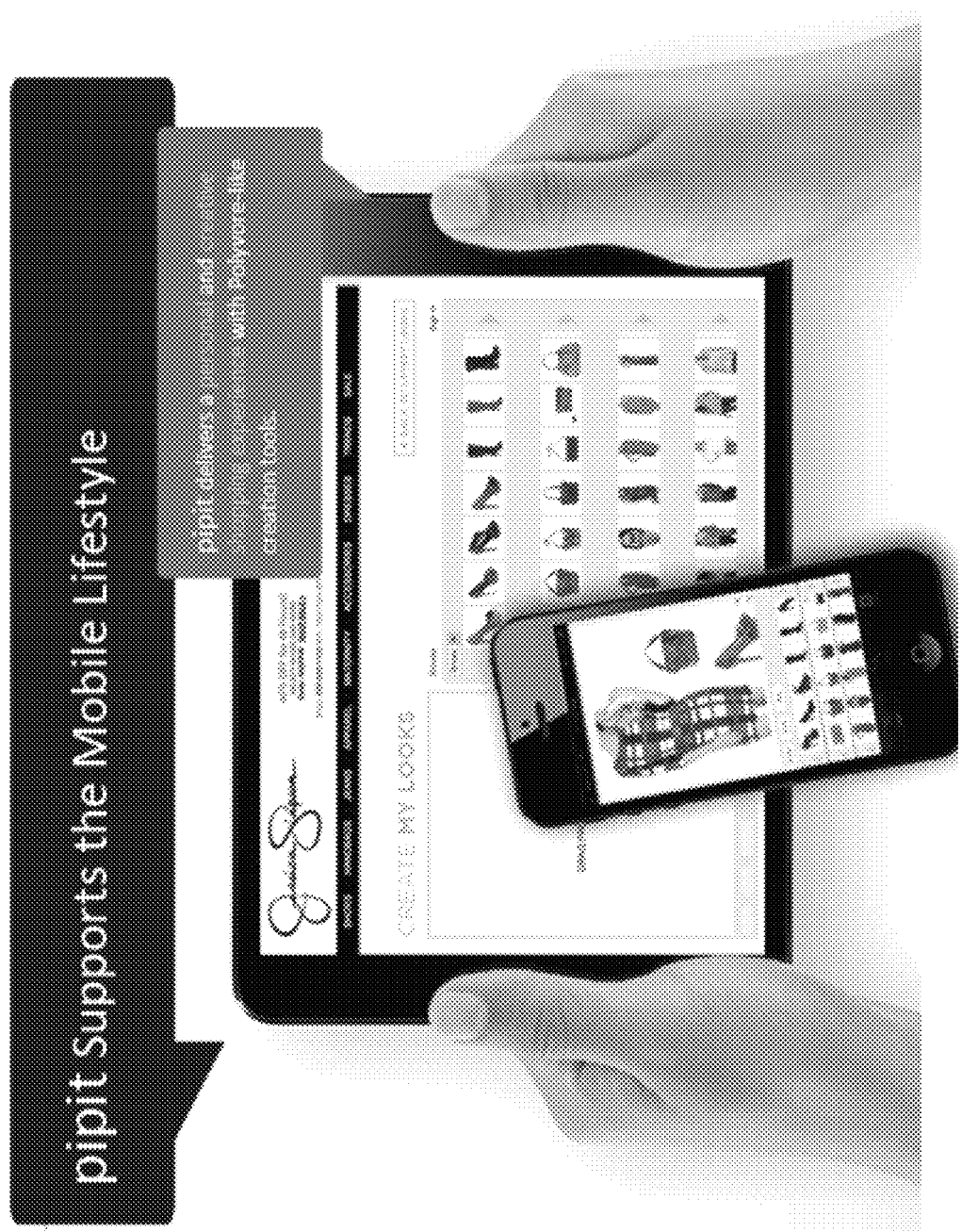
Figure 7:
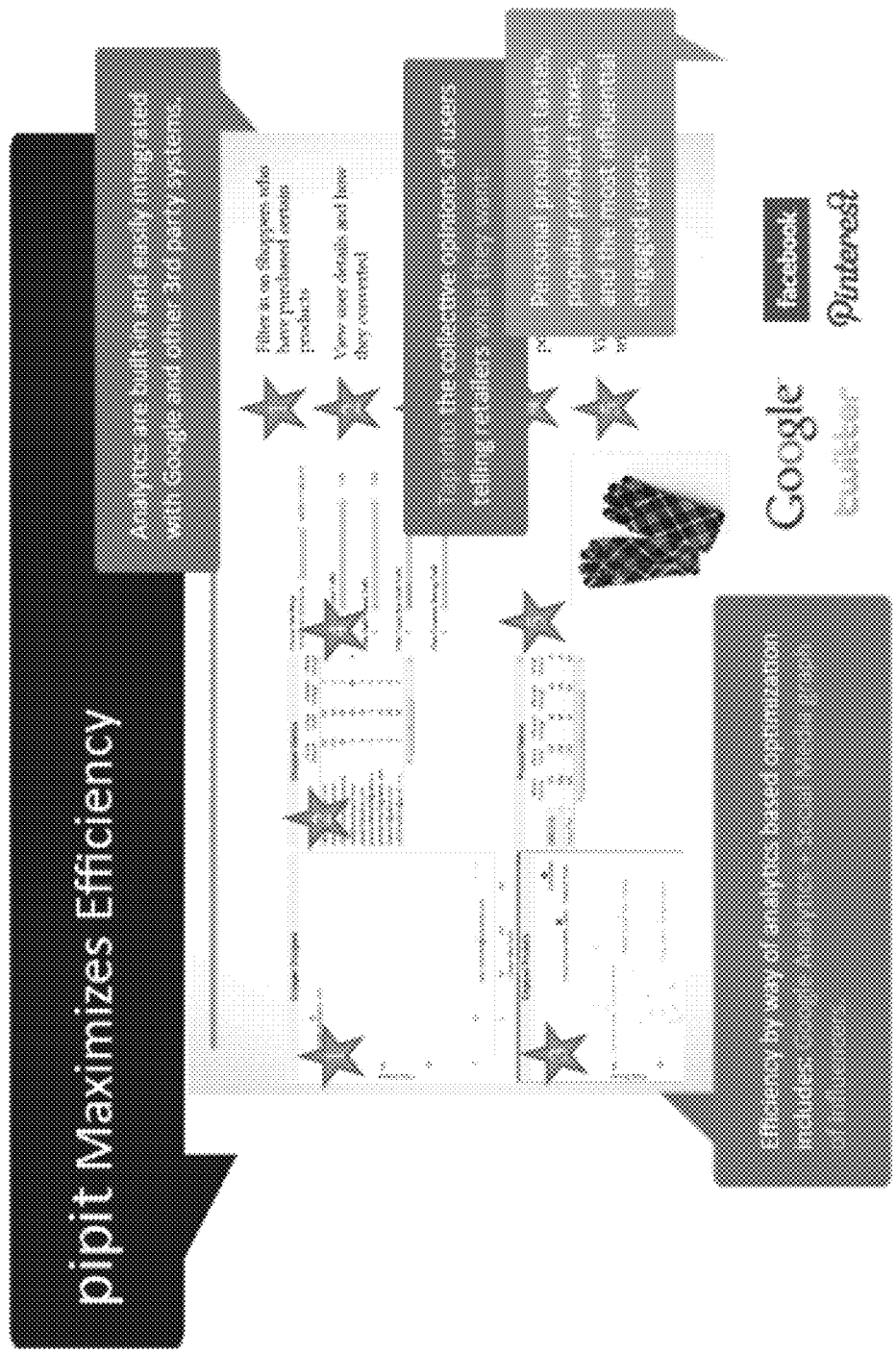
Figure 8:
Figure 9:
Figure 10A:
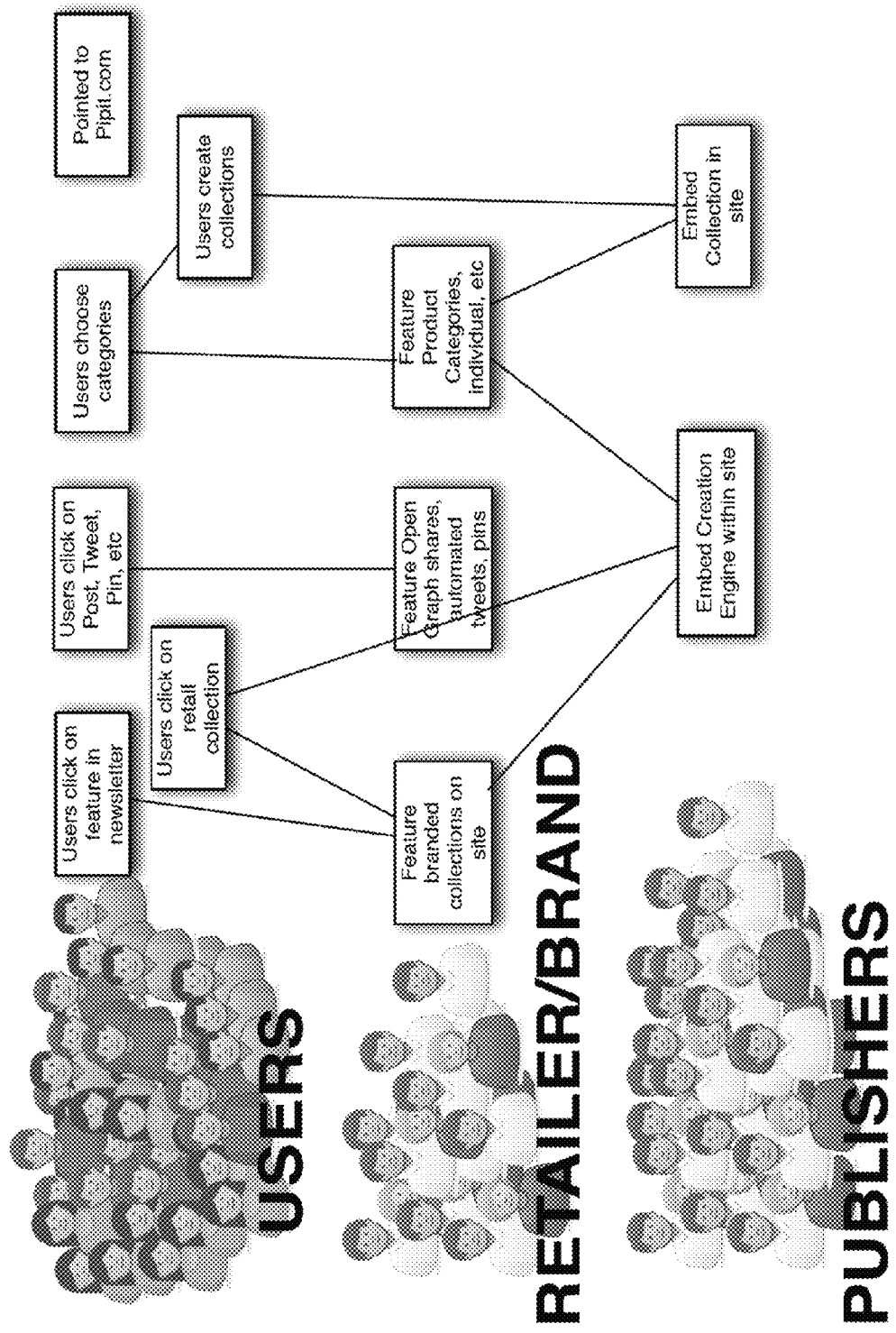
FIGS. 10A-10B show another exemplary user interface for a social framework for consumer generated content engine for shopping.
Figure 10B:
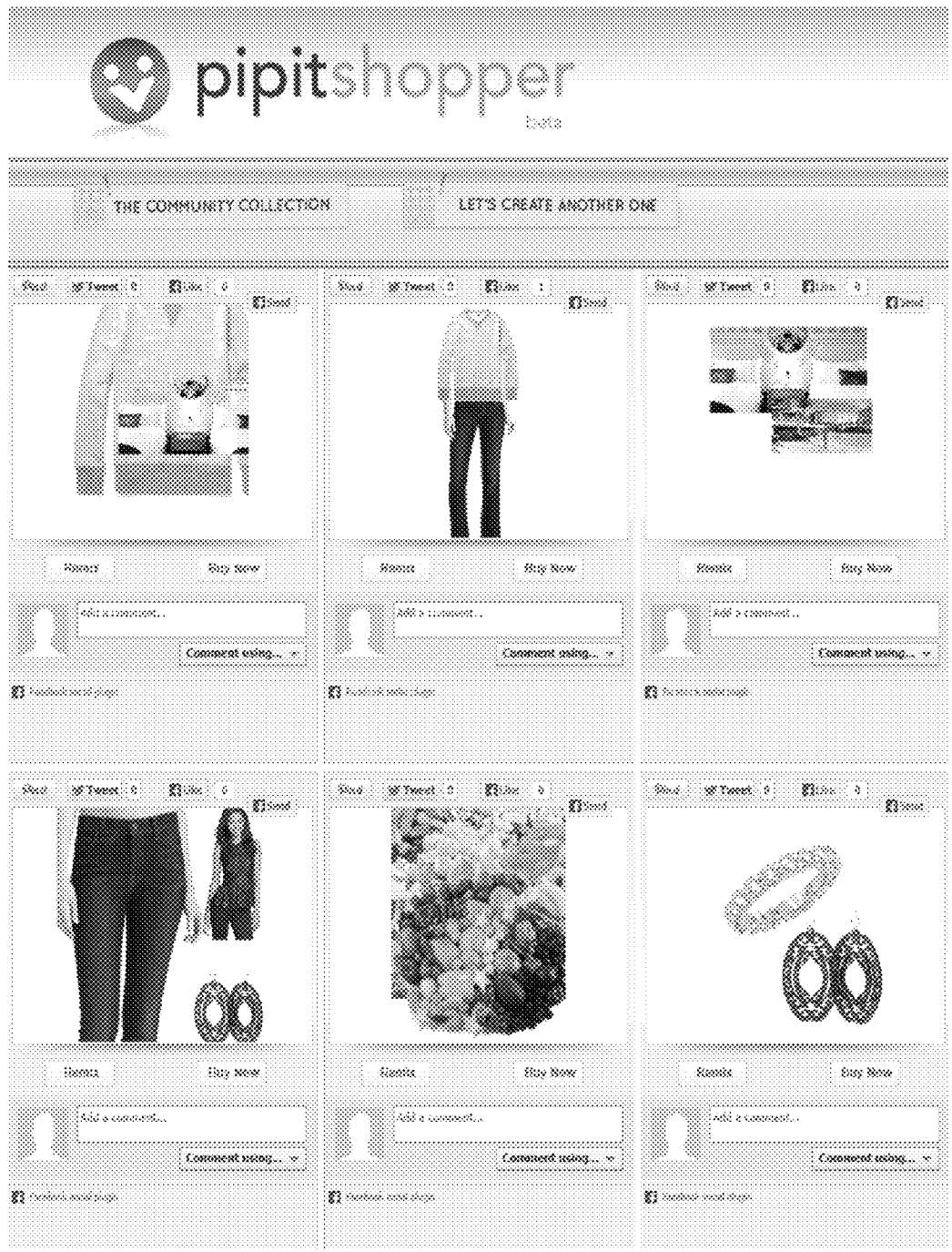

In one embodiment available at www.pipit.com, the system allows users to create, aggregate, and syndicate group of product or content attribute collection and provide ways to access, display, filter, share, merchandise, shop and consume the created content repository using a collection recommendation and merchandising engine via web services independent of where the content is created or updated. The "Pipit Collections System" is an eco-system with a way to create, access, view, share, present, syndicate, filter, merchandise, and shop various collections (from now on called as "Pipit Content"), which is a list of group of products and/or content with attributes (name, SKU, price, image, description, etc.,) and associated attribute content (a name, category, created by, created date, number views, number of shares, number of social likes, creator type, etc.,) that could be created—by providing a visitor an option to create a group of selected products from a product catalog with options to filter/chose specific product from the product catalog—which could be aggregated from various websites, applications and systems, and can be stored as a data base repository (from now on called as "Pipit Collection Repository" or PCR). PCR data could be accessed/shared/syndicated by other websites or applications leveraging a collection recommendation and merchandising engine via web services or API integration. "Pipit Content" collection could be something like a look(s) or an outfit(s) with multiple products with product and content attributes, or a buddy list of multiple products with attributes, or a wish list of product attributes and their associated attributes.

One embodiment of the Pipit Collections system includes the following functions:

Ability to Create/Save Collections (Pipit Collection) at one or more websites or by apps Syndicate the created collections independent of where the Pipit content is created, and aggregates into a Pipit Collection Repository (PCR)

Provides access to PCR and its recommendation and merchandising engine via web services or API integration Provides the ability to share, view, filter, merchandise, and shop the aggregated PCR data at to one more websites including Pipit.com and/or apps Ability to track, monitor, and report the usage metrics The Pipit Collections system aggregates the "Pipit Content" collection data (PCR) created at and/or by Pipit.com or external websites, and provides ways (via direct access, or web services or other means) to consume the PCR data via a web, and/or mobile and/or web services so that a visitor can access, view, share, and shop the "Pipit Content" independent of where the original content is created whether Pipit Content is created at Pipit.com or external website, but will be hosted and displayed for visitors at Pipit.com website The Pipit Collections system could be accessed via a web browser, website, or a mobile website, or a mobile app or a web service and PCR data could be displayed on any device where HTML content can be displayed.

The Pipit Collections system will have options to filter the PCR data based on product or associated attributes for example, a given product brand, manufacturer, or a retailer brand, or an option type (size, or color), or a keyword ("green paint", "diamonds", or "sandals", etc.,) and will have ability to see each product's attributes within the "Pipit Content" (say, a look, or an outfit, etc.,), and be able to view, shop or purchase a product or multiple products or the entire "pipit content" (for example, an entire outfit with various products).

Figure 11:
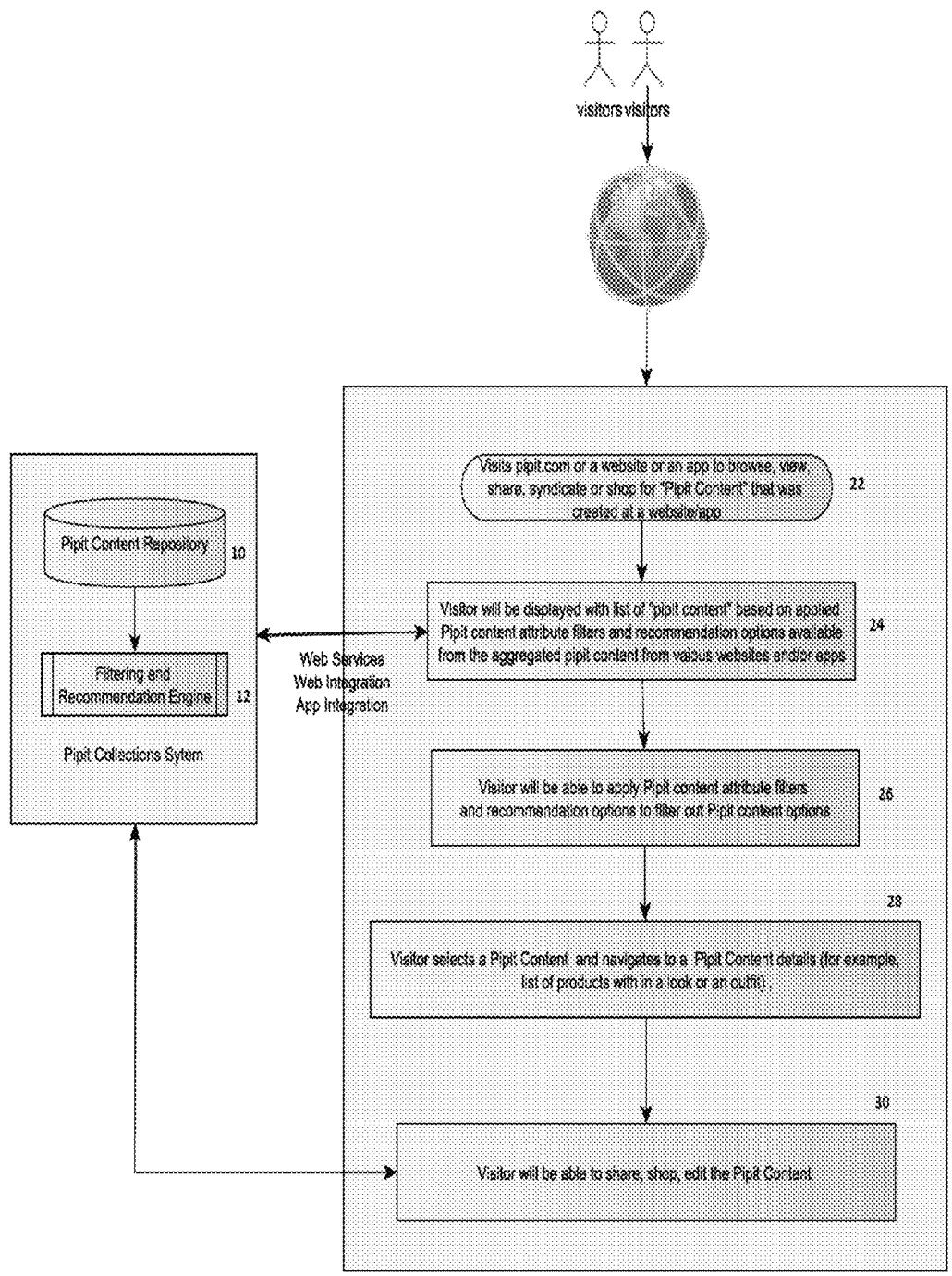
FIG. 11 shows an exemplary process to view, edit, shop, consume and share e-commerce content.

FIG. 11 shows an exemplary process to view, edit, shop, consume and share e-commerce items. These items are stored in a content repository 10 and filtered through a recommendation engine 12. Data from a plurality of repositories and recommendation engines form a collection system. Next, the recommendation engine operation is discussed. In one embodiment, a web-based product with a user interface that's written in HTML5, which can be both a web-based storefront (with the recommendation engine and transactional capabilities built-in), as well as a mobile rich-media ad unit with very similar functionality of the full version of the product (the web-based store front), except in a smaller scale with more targeted options (based on the demographic the mobile ad is displayed-to). This product will function as a personal shopping recommendation engine, and will, at some point, also be integrated in the brick-and-mortar/physical retail shopping experience.

The recommendation engine scrapes metadata from items selected in an "art-board" and extrapolates that data to recommend other items. These recommended other items should be based-on what other users have selected from the "art-board" and paired together, as well as what other users have removed from their respective art boards.

Essentially, this process is analogous to Pandora's music genome project, recommending music that others with similar preferences have "liked" or "disliked," allowing users to create custom curated collections that are influenced by the process (essentially, influenced by other users of the system as well as the system's pairing for tags included in the metadata).

The recommendations processes operate by attempting to match users to other users having similar behaviors or interests. For example, once Users A and B have been matched, items favorably sampled by User A but not yet sampled by User B may be recommended to User B. In contrast, content-based recommendation systems seek to identify items having content (e.g., text) that is similar to the content of items selected by the user. Other recommendation systems use item-to-item similarity mappings to generate the personalized recommendations. The item-to-item mappings may be generated periodically based on computer-detected correlations between the item purchases, item viewing events, or other types of item selection actions of a population of users. Once generated, a dataset of item-to-item mappings may be used to identify and recommend items similar to those already "known" to be of interest to the user.

In one embodiment, the collection system can be a server that communicates through web services, web application or application integration to a client computer or mobile phone, for example. In FIG. 1, a customer visits a web site or uses an app to browse, view, share, syndicate or shop for content created at a website or through an application (22). The visitor will be displayed with a list of Pipit contents based on applied content attribute filters and recommendation options available from the aggregated Pipit content from various websites and/or apps (24). The visitor can then apply Pipit content attribute filters and recommendation options to filter out content options (26). The visitor can then select a Pipit content detail such as a list of products within a look or an outfit (28). The visitor can then share, shop, or edit the Pipit content as desired (30).

Figure 12:
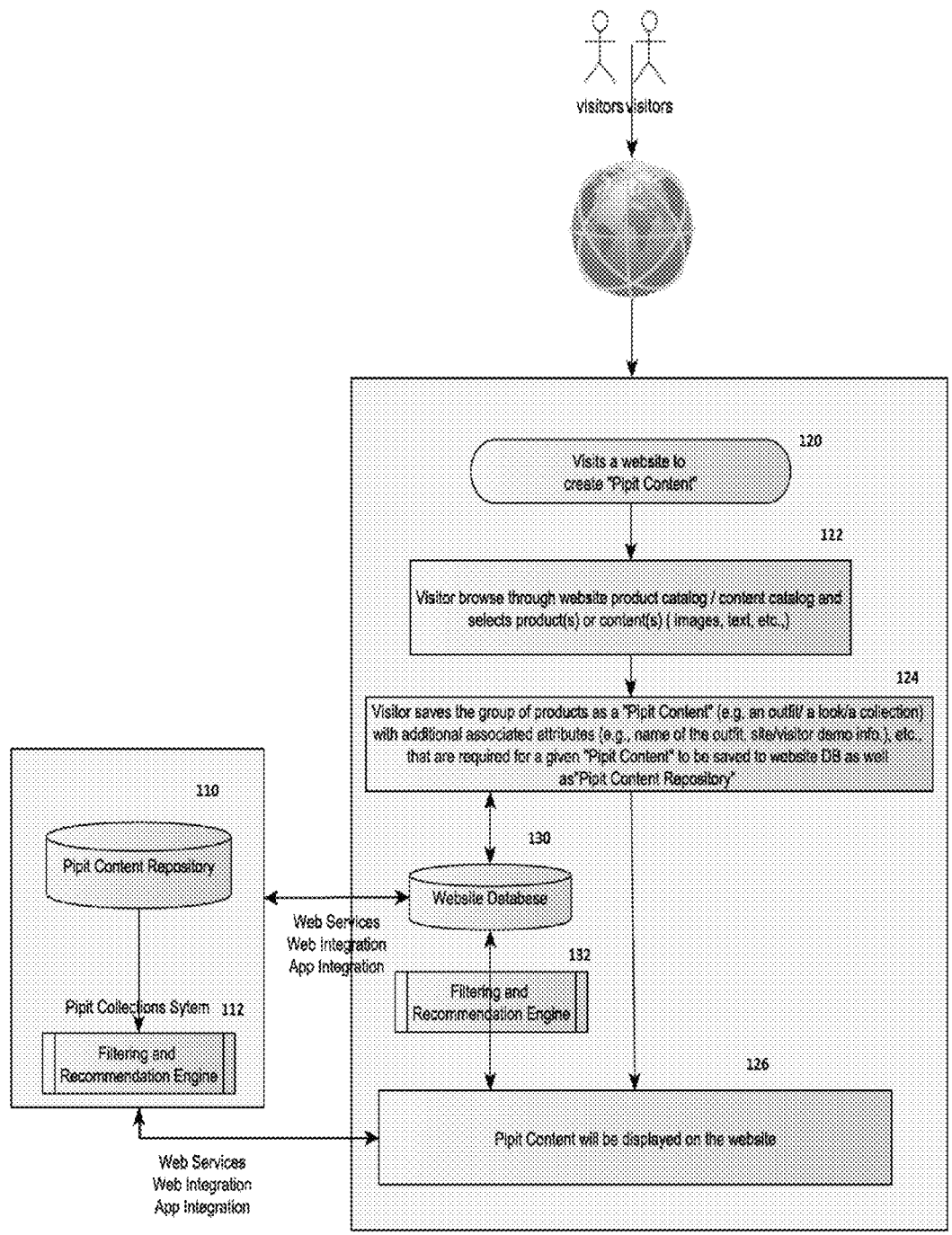
FIG. 12 shows an exemplary content creation process at a third party web site.

FIG. 12 shows an exemplary content creation process at a third party web site. The process stores content in a Content Repository 110 that communications with a filtering and recommendation engine 112, which collectively is the Pipit collection system. In this process, a user visits a third party web site to create the content (120). Next, the user browses the website product catalog or content catalog and selects products or contents (122). The user or visitor then saves a group of product as a Pipit content (such as a collection of looks or outfits) with additional associated attributes such as the name of the outfit or the site/visitor demo information, among others. The Pipit content is then saved to the website's database 130 as well as the Pipit content repository 110 (124). The website database 130 communicates with the Pipit content repository 110 through web services, web integration and app integration, among others. A filtering and recommendation engine 132 communicates with the website database 132 and provides content to be displayed on the website (126).

Figure 13:
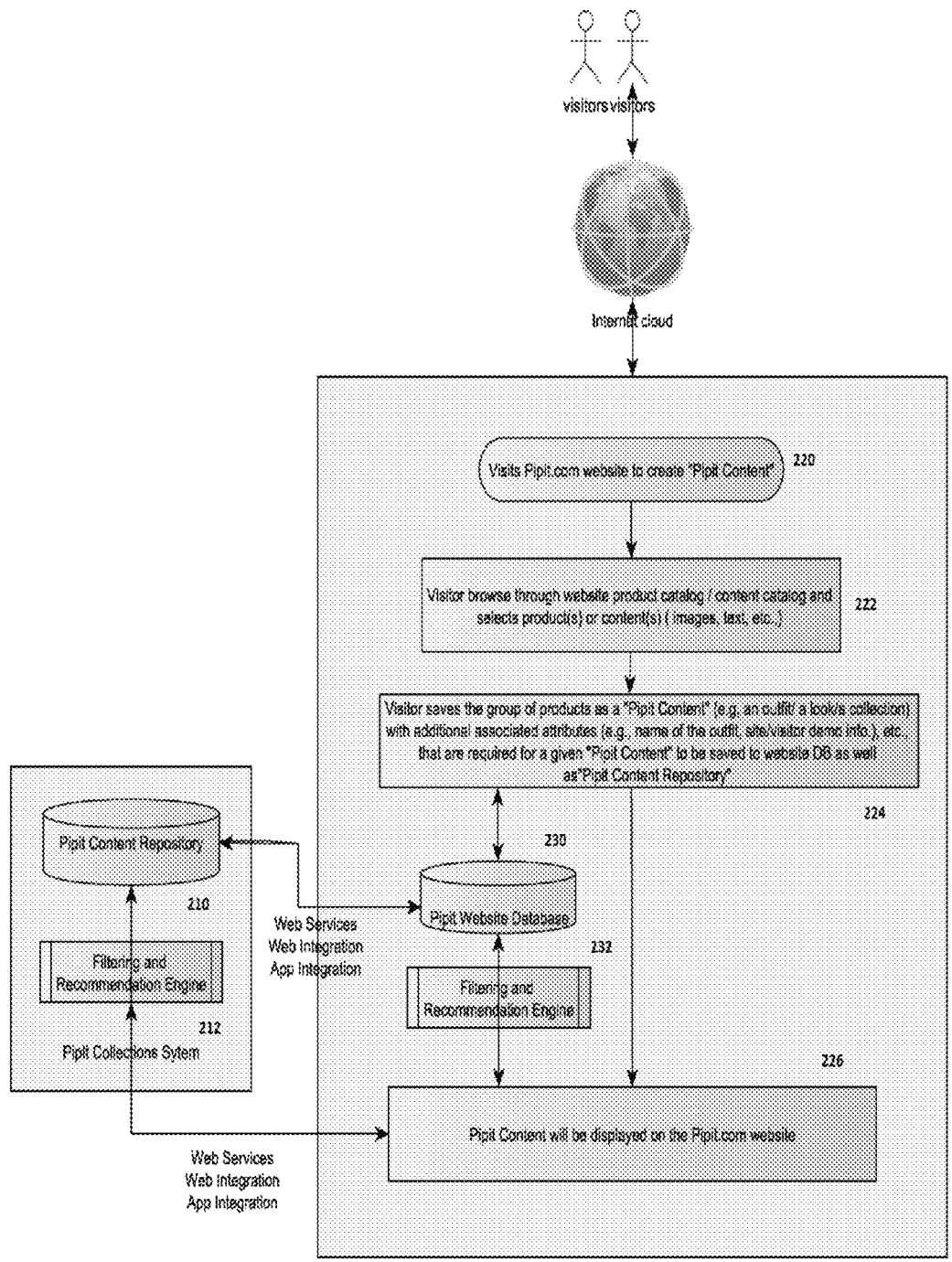
FIG. 13 shows an exemplary content creation process at Pipit's web site.

FIG. 13 shows an exemplary content creation process at Pipit's web site. The process stores content in a Content Repository 210 that communications with a filtering and recommendation engine 212, which collectively is the Pipit collection system. In this process, a user visits the Pipit web site to create the content (220). Next, the user browses the website product catalog or content catalog and selects products or contents (222). The user or visitor then saves a group of product as a Pipit content (such as a collection of looks or outfits) with additional associated attributes such as the name of the outfit or the site/visitor demo information, among others. The Pipit content is then saved to the Pipit database 230 as well as the Pipit content repository 210 (224). The website database 230 communicates with the Pipit content repository 210 through web services, web integration and app integration, among others. A filtering and recommendation engine 232 communicates with the website database 232 and provides content to be displayed on the website (226). The Pipit content from the Pipit content repository 210 communicates through web services, web integration, or app integration to provide data to be displayed on the Pipit web site.

The visualization board of FIGS. 2-10, combined with the network and marketplace applications can include one or more applications which support the network-based marketplace, and can generate and maintain relationships between products, community groups and their members' rules and roles, and transactions that may be associated with the network-based marketplace shopping cart including the products purchased through it. The associated relationships may include distribution parameters, e.g., roles and rules pertaining to the item list and associated community group(s), reviews and recommendations pertaining to the items of the item list, item attributes like model and manufacturer, or service provider of a particular item, item status, e.g., purchased, etc. Additionally, the various applications may support social networking functions, including building and maintaining the community groups created by a user, relating one or more item lists to selected community groups, and providing a shared electronic shopping cart for the community groups to purchase items from the shared item list.

On-line store or e-commerce applications may allow sellers to group their listings, e.g., goods and/or services, in the visualization boards 10 within a "virtual" store, which may be branded and otherwise personalized by and for the sellers. Such virtual storyboards 10 may also offer promotions, incentives and features that are specific and personalized to a relevant seller. In one embodiment, the listings and/or transactions associated with the virtual storyboards and their features may be provided to one or more community groups having an existing relationship with the item list creator. An existing relationship or association may include a friend or family relationship, a transactional relationship, e.g., prior sales with user, or an overall network community relationship, e.g., buyers historical transaction rating. Reputation applications may allow parties that transact utilizing the network-based marketplace 36 and the storyboards 10 to establish, build and maintain reputations, which may be made available and published to potential trading partners.

A number of fraud prevention applications may implement various fraud detection and prevention mechanisms to reduce the occurrence of fraud within the marketplace. In one embodiment, the fraud prevention applications may monitor activities of each user within the community group. For example, the item list creator may want to be informed if a member of the community group adds items to the virtual storyboard or changes shipping information, provided the member had the necessary permissions. In various embodiments, whether to monitor and the level of monitoring may depend upon the relationship to the item list creator. For example, an indirect relationship may be more heavily monitored than a direct relationship.

Messaging applications may be used for the generation and delivery of messages to users of the network-based marketplace 36. Messages can, for example, advise the visualization board creator and members of the community groups associated with an item list of the status of the various items on the list, e.g., already purchased, etc. In one embodiment, the messaging applications may be used in conjunction with the social networking applications to provide promotional and/or marketing information to the community members associated with the item list to assist them in finding and purchasing items on the visualization board.

A reporting application connected with the virtual storyboard 10 can compile statistical data relating to the products, selection, choices, and/or preferences of users with respect to selecting products and/or combinations. A ranking system could be created whereby such information is compiled statistically and made available to merchants for trend analysis. Additionally such information could be combined with "recommendation engines" to suggest products automatically or manually. In one embodiment, such recommendation engine could include a collaborative filtering engine that catalogs and indexes similar users with their choices of products and recommends the choices of one similar user to the others.

A user table may contain a record for each registered user of the network-based marketplace, and may include identifier, address and financial instrument information pertaining to each such registered user. In one embodiment, a user operates as an item visualization board creator or a member of a community group, including associated operations pertaining to the rules and roles, created by the visualization board creator. A user may also operate as a seller, a buyer, or both, within the network-based marketplace. The tables may also include a visualization board table that maintains listing or item records for goods and/or services created by a visualization board creator. In one embodiment, the visualization board is created for sharing with a community group defined, at least in part, by the visualization board creator.

Furthermore, each listing or item record within the visualization board table may be linked to one or more electronic shopping cart records within a electronic shopping cart table and to one or more user records within the user table and/or a vendor table, to associate a seller or vendor and one or more actual or potential buyers from the community group with each visualization board.

A transaction table may contain a record for each transaction pertaining to items or listings for which the user defined community group rules and roles pertain to one or more items of the visualization board. For example, the visualization board creator may not want a member of a community group to be able to view, purchase, edit, etc., any or all of the items in the visualization board. In another example, rules may include an ability to purchase an item on the list, purchase one or more items using the creator's account, add to the visualization board, etc.

Additionally, the visualization board creator may want to assign roles to an entity within the community group. For example, roles may include a buyer, a reviewer, an administrator, etc. Accordingly, a rules applications and a roles applications may be used in conjunction with social networking applications to customize the visualization board to be shared within one or more community groups.

The relationship or association between the visualization board creator (user) and the members of the one or more community groups may be a direct relationship or an indirect relationship. An example of a direct relationship may be a sister, a friend, or a trusted associate user, while the indirect relationship may be a secondary entity brought in by a direct relationship.

The web servers can access one or more additional repositories of user data. Because a group of individuals can share an account, a given "user" may include multiple individuals (e.g., two family members that share a computer). The data stored for each user may include one or more of the following types of information (among other things) that can be used to generate recommendations in accordance with the engine: (a) the user's purchase history, including dates of purchase, (b) a history of items recently viewed by the user, (c) the user's item ratings profile, if any, and (d) items tagged by the user. Various other types of user information, such as wish list/registry contents, email addresses, shipping addresses, shopping cart contents, and browse (e.g., clickstream) histories, may additionally be stored.

The network system also includes a network-based provider having a data exchange platform, such as an art board, to provide server-side functionality via a network, e.g., the Internet, to one or more clients, including users that may utilize the network system through the network-based provider to exchange data over the network. The data exchange may include transactions such as receiving and processing data from a multitude of users. The data may include, but is not limited to, shared recently viewed products, product and service reviews, product, service, manufacture, and vendor recommendations, product and service listings, auction bids, feedback, etc.

In an exemplary embodiment, the network-based marketplace, the network-based provider including the data exchange platform, an application program interface (API) server, and a web server are coupled to, and provide programmatic and web interfaces respectively to, one or more application servers. The application servers host one or more networking applications and marketplace applications. The applications servers, in turn, are coupled to one or more database servers that facilitate access to one or more databases. The marketplace application may provide a number of marketplace functions and services, e.g., listing, payment, etc., to users that access the network-based marketplace.

This inventive system also embodies the notion of a third party application, executing on a third party server machine, as having programmatic access to the network-based marketplace via the programmatic interface provided by the API server. For example, the third party application may, utilizing information retrieved from the network-based marketplace, support one or more features or functions on a website hosted by the third party. The third party website may, for example, provide one or more networking, marketplace or payment functions that are supported by the relevant applications of the network-based marketplace. Under such embodiments, multiple network and marketplace applications, respectively, could be part of the network-based marketplace.

Various other applications, separate or as part of the network-based marketplace, may support social networking functions. These could include allowing the user to create groups of other users, affiliates, and lists of friends, and to facilitate various group communications to those lists and users, including distributing products in the network-based marketplace. While the social networking applications and the marketplace applications are discussed here as joined to form part of the network-based marketplace, in alternative embodiments, the networking applications may form part of a social networking service that is separate and distinct from the marketplace.

The various components of the web site system may run, for example, on one or more servers (not shown). In one embodiment, various components in or communicating with the recommendations service are replicated across multiple machines to accommodate heavy loads.

Each of the processes and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage.

The various features and processes described above may be used independently of one another, or may be combined in various ways. All possible combinations and subcombinations are intended to fall within the scope of this disclosure. In addition, certain method or process steps may be omitted in some implementations.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any of the incorporated-by-reference materials.

What is claimed is:

1. A method for performing e-commerce, comprising:
   providing a visitor an option to create a group of selected products from a product catalog;
   choosing a predetermined product from a product catalog aggregated from the group with either a web site or an application;
   displaying content based on one or more attribute filters and recommending options from aggregated content from the website or application;
   selecting an item from the website or application and displaying item details for sharing, shopping or editing content for the item;
   displaying a toolbar on an art board, wherein the toolbar is used for inviting users and placing items onto the art board; and
   storing the item and item details in a database repository and recommending a similar art board or an alternative art board based on product attribute(s), visitor behavioral attribute(s), content attribute(s), and associated attributes.

2. The method of claim 1, wherein the predetermined product has primary attributes including name, unit, price, image, or description, and secondary attribute content including name, category, creator, date created, number of views, number of shares, number of social likes, or creator type.

3. The method of claim 1, comprising forming a collection for one or more looks or outfits with multiple products with product and content attributes, or a buddy list of multiple products with attributes, or a wish list of product attributes and associated attributes.

4. The method of claim 1, comprising generating a user interface written in HTML5 for a web-based storefront with a recommendation engine and transactional capabilities built-in, as well as a mobile rich-media ad unit with targeted options.

5. The method of claim 1, comprising scraping metadata from items selected in an art board and extrapolating from the metadata to recommend other items.

6. The method of claim 5, wherein the recommended other items are based on what other users have selected from the art board and paired together, and what other users have removed from their respective art boards.

7. The method of claim 1, comprising performing real time and aggregated recommendations, building a recommendation engine by mining data in real-time to provide relevant results, and generating real-time metrics based upon user patterns.

8. The method of claim 1, comprising:
activating an art board from a network-based marketplace;
placing one or more items stored in the database repository onto the art board;
recommending additional items to place on the art board;
inviting users to interact with the art board; and
collaborating regarding art board items.

9. A system for performing e-commerce, comprising:
a processor;
a data storage device coupled to the processor and containing code for:
providing a visitor an option to create a group of selected products from a product catalog;
choosing a predetermined product from a product catalog aggregated from the group with either a website or an application;
displaying content based on one or more attribute filters and recommending options from aggregated content from the web site or application;
selecting an item from the website or application and displaying item details for sharing, shopping or editing content for the item;
displaying a toolbar on an art board, wherein the toolbar is used for inviting users and placing items onto the art board;
storing the item and item details in a database repository and recommending a similar art board or an alternative art board based on product attribute(s), visitor behavioral attribute(s), content attribute(s), and associated attributes; and
storing the item and item details in a database repository.

10. The system of claim 9, wherein the predetermined product has primary attributes including name, unit, price, image, or description, and secondary attribute content including name, category, creator, date created, number of views, number of shares, number of social likes, or creator type.

11. The system of claim 9, comprising code for forming a collection for one or more looks or outfits with multiple products with product and content attributes, or a buddy list of multiple products with attributes, or a wish list of product attributes and associated attributes.

12. The system of claim 9, comprising code for generating a user interface written in HTML5 for a web-based storefront with a recommendation engine and transactional capabilities built-in, as well as a mobile rich-media ad unit with targeted options.

13. The system of claim 9, comprising code for scraping metadata from items selected in an art board and extrapolating from the metadata to recommend other items.

14. The system of claim 13, wherein the recommended other items are based on what other users have selected from an art board and paired together, and what other users have removed from their respective art boards.

15. The system of claim 9, comprising code for performing real time and aggregated recommendations, building a recommendation engine by mining data in real-time to provide relevant results, and generating real-time metrics based upon user patterns.

16. The system of claim 9, comprising code for:
activating an art board from a network-based marketplace;
placing one or more items stored in the database repository onto the art board;
recommending additional items to place on the art board;
inviting users to interact with the art board; and
collaborating regarding art board items.

* * * * *